US008809561B2

(12) United States Patent
Bellussi et al.

(10) Patent No.: US 8,809,561 B2
(45) Date of Patent: Aug. 19, 2014

(54) HYBRID, ORGANIC-INORGANIC, CRYSTALLINE, POROUS SILICATES AND METAL-SILICATES

(75) Inventors: Giuseppe Bellussi, Piacenza (IT); Angela Carati, San Giuliano Milanese (IT); Mariangela Cozzolino, Milan (IT); Caterina Rizzo, San Donato Milanese (IT); Stefano Zanardi, Trecate (IT)

(73) Assignee: ENI S.p.A., Rome (IT)

( * ) Notice: Subject to any disclaimer, the term of this patent is extended or adjusted under 35 U.S.C. 154(b) by 227 days.

(21) Appl. No.: 13/254,999

(22) PCT Filed: Feb. 25, 2010

(86) PCT No.: PCT/IB2010/000407
§ 371 (c)(1),
(2), (4) Date: Nov. 8, 2011

(87) PCT Pub. No.: WO2010/106408
PCT Pub. Date: Sep. 23, 2010

(65) Prior Publication Data
US 2012/0059181 A1 Mar. 8, 2012

(30) Foreign Application Priority Data
Mar. 5, 2009 (IT) .............................. MI2009A0325

(51) Int. Cl.
*C07F 7/08* (2006.01)
*B01J 20/00* (2006.01)
(52) U.S. Cl.
USPC ............. 556/10; 502/407; 556/173; 556/402; 556/405; 556/406
(58) Field of Classification Search
USPC ............. 556/10, 173, 402, 406, 405; 502/407
See application file for complete search history.

(56) References Cited

U.S. PATENT DOCUMENTS

| 2007/0173401 | A1* | 7/2007 | Landskron et al. ........... 502/232 |
| 2008/0193734 | A1 | 8/2008 | Whitnall et al. |
| 2010/0191009 | A1 | 7/2010 | Bellussi et al. |

FOREIGN PATENT DOCUMENTS

| WO | 2005 087369 | 9/2005 |
| WO | 2008 017513 | 2/2008 |

OTHER PUBLICATIONS

International Search Report issued Apr. 23, 2010 in PCT/IB10/000407 filed Feb. 25, 2010.
Bellussi, G., et al., "Crystalline hybrid organic-inorganic aluminosilicates," Microporous and Mesoporous Materials, vol. 113, pp. 252-260, (Feb. 21, 2008) XP 022700178.
Diaz-Morales, U., et al., "Ethane-silica hybrid material with ordered hexagonal mesoporous structure," Microporous and Mesoporous Materials, vol. 87, pp. 185-191, (Oct. 3, 2005) XP 025179258.

* cited by examiner

*Primary Examiner* — Porfirio Nazario Gonzalez
(74) *Attorney, Agent, or Firm* — Oblon, Spivak, McClelland, Maier & Neustadt, L.L.P.

(57) ABSTRACT

The present invention relates to new hybrid, organic-inorganic hybrid silicates and metal-silicates characterized by a crystalline structure containing structural units having formula (a), wherein R is an organic group possibly containing one or more element T selected from Group IIIB, IVB, VB and from transition metals. A process starting from cyclic trisilanes for the preparation of said materials, is also described. These materials can be used as molecular sieves, adsorbents, in the field of catalysis, in the field of electronics, in the field of sensors, in the area of nanotechnology.

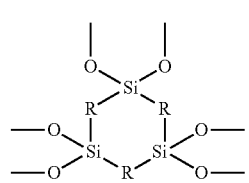

(a)

23 Claims, 1 Drawing Sheet

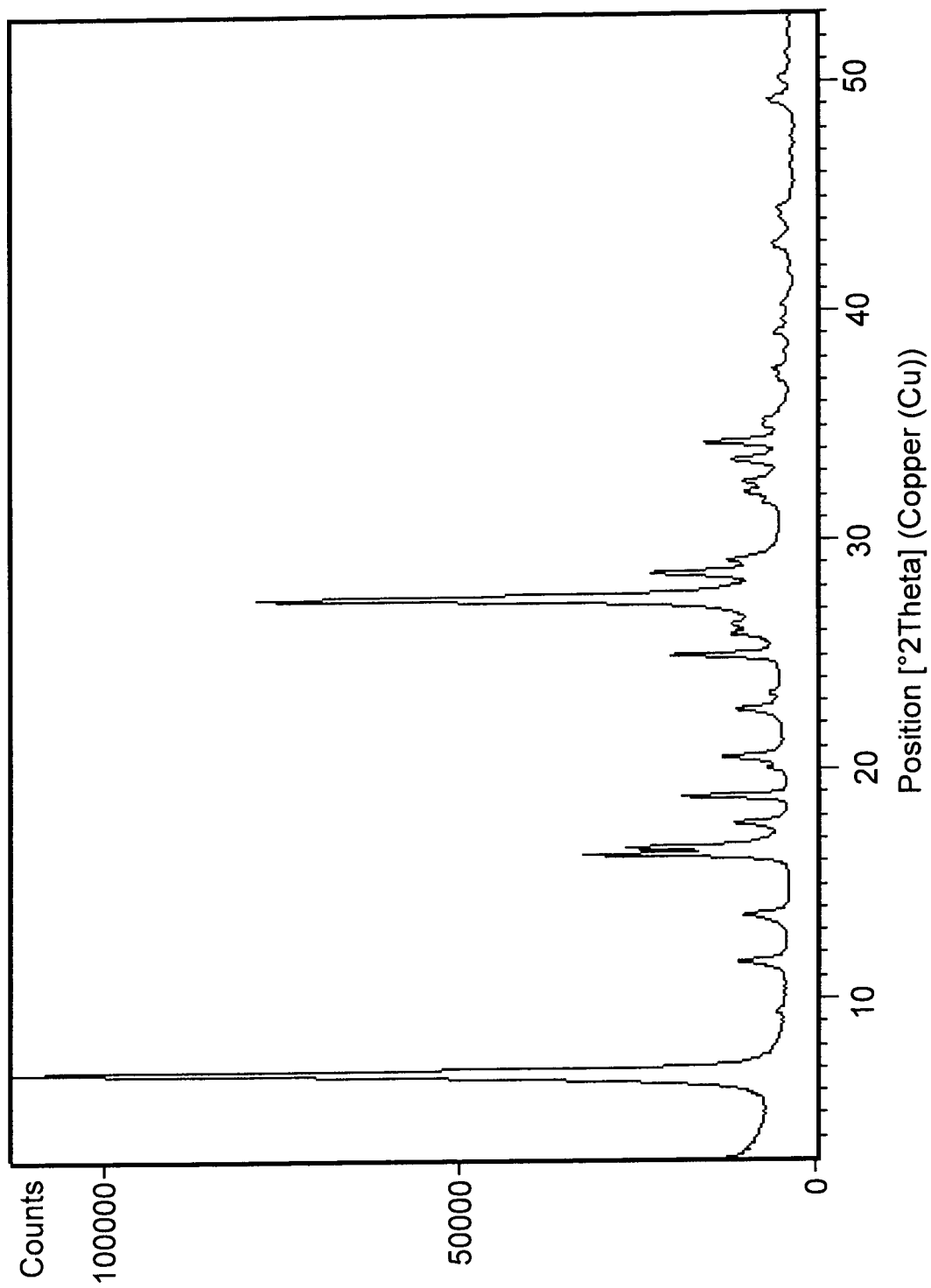

HYBRID, ORGANIC-INORGANIC, CRYSTALLINE, POROUS SILICATES AND METAL-SILICATES

The present invention relates to hybrid, organic-inorganic silicates and metal-silicates having a crystalline structure and a process for the preparation thereof.

Silicates and metal silicates are a group of compounds which can produce three-dimensional crystalline structures, both compact and porous (zeolites), lamellar (micas and clays) or linear. Zeolites and clays have been of great relevance in the evolution of catalytic processes and in the separation of mixtures of different molecules. Their properties are correlated to the geometry of the crystalline structure and with the chemical composition, which determines the acid and polar characteristics. Zeolites, in particular, are crystalline-porous solids having a structure consisting of a three dimensional lattice of tetrahedral TO4 connected with each other by means of the oxygen atoms, wherein T is a tri- or tetravalent tetrahedral atom, for example Si or Al.

The substitution of Si or Al with other elements, such as Ge, Ti, P, B, Ga and Fe has allowed the physico-chemical properties of the materials to be modified, obtaining products having new properties, used as catalysts or molecular sieves.

In order to modify the properties of these materials even more profoundly, studies are underway for synthesizing organic-inorganic hybrids in which at least one portion of the silica precursor consists of mixed silicates containing at least one Si—C bond. In particular, attempts have been made to synthesize structures of silicates and crystalline-porous metal-silicates containing organic groups inside the lattice, starting from di-silane precursors in which an organic group is bound to two silicon atoms.

Inagaki et al., in Nature 416, 304-307 (21 Mar. 2002) describes the synthesis of an ordered mesoporous hybrid silicate, containing ≡Si—$C_6H_4$—Si≡ groups. This material has a hexagonal distribution of the pores with a lattice constant equal to 52.5 Å and walls delimiting the pores with a structural periodicity of 7.6 Å along the direction of the channels. The material was synthesized by adding 1,4-bis (triethoxysilyl)benzene in an aqueous solution containing octadecyl trimethyl ammonium chloride as surfactant, and soda. The powder X ray diffraction pattern shows three reflections at low angular values (2θ<4.7°), with 2θ=1.94°, 3.40°, 3.48°, corresponding to interplane distances d=45.5, 26.0, 22.9 Å, and 4 reflections in the region 10°<2θ<50° (2θ=11.64°, 23.40°, 35.92° and 47.87°, corresponding to d=7.6, 3.8, 2.5 and 1.9 Å). A further reflex was localized at about 20.5° of 2θ, but this is enlarged and poorly defined.

JP2002-211917-A describes the introduction of at least one ≡Si—R—Si≡ unit in the known zeolite phase structures. In particular, the MFI, LTA, MOR structures are described, in which a small portion of the oxygen bridged between two silicon atoms (≡Si—O—Si≡) is substituted by methylene groups (≡Si—$CH_2$—Si≡). Ratios of silicon bound to the carbon, with respect to the total silicon not higher than 10% are exemplified. In this ratio, heteroatoms different from silicon possibly present in the structure, such as aluminium, for example, are not taken into consideration.

The syntheses are effected using bistriethoxysilyl-methane (BTESM) as silica source, possibly in the presence of tetraethyl orthosilicate. The synthesis method used is that adopted for the synthesis of known zeolite structures and resort is possibly made to the use of templates. Under the synthesis conditions described, important breakage phenomena of the Si—C bond are observed, which therefore remains only partially integral in the final structure.

In accordance with the above, the $^{29}$Si-MAS—NMR spectra of the samples show a minority signal at −60 ppm, attributed to the presence of Si—C bonds (T ($SiCO_3$) sites with a chemical shift from −40 to −85 ppm [a] I. G. Shenderovich et al., J. Phys. Chem. B., 111, 12088-12096 (2007); b) D. Mochizuki, S. Kowata, K. Kuroda, Chem. Mater., 18, 5223-5229 (2006); c) J. T. A. Jones et al., Chem. Mater., 20, 3385-3397 (2008)]).

Furthermore, strong signals are also present in the samples prepared using BTESM alone as silica source, which can be attributed to Q4 (about −115 ppm) and Q3 (about −105 ppm) sites, corresponding to Si atoms surrounded by four tetrahedral O—$SiO_3$ and by three tetrahedral O—$SiO_3$ and an —OH group, respectively. This confirms a consistent breakage of the Si—C bond of the BTESM precursor.

Probably due to the low substitution level of the ≡Si—O—Si≡ groups with the ≡Si—$CH_2$—Si≡ groups, materials having very different properties with respect to their inorganic correspondent products, were not obtained.

WO2005087369 describes the possibility of preparing hybrid organic-inorganic silicates and metal-silicates having an ordered mesoporous structure.

WO2008/017513 describes hybrid organic-inorganic silicates and metal-silicates called ECS (Eni Carbon Silicates), characterized by an X-ray diffractogram with reflections exclusively at angular values higher than 4.0° of 2θ, preferably exclusively at angular values over 4.7 of 2θ, and characterized by an ordered structure containing structural units having formula (A), wherein R is an organic group:

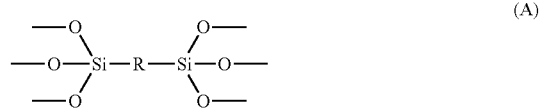

(A)

which possibly contains one or more elements T selected from elements belonging to groups IIIB, IVB and VB, and transition metals, with an Si/(Si+Ti) molar ratio in said structure, higher than 0.3 and lower than or equal to 1, wherein Si is the silicon contained in the structural unit of formula (A).

In their preparation, these products include the use of disilanes as silica source, characterized by the following formula

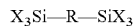

wherein R is an organic group and X is a substituent which can be hydrolyzed.

New hybrid organic-inorganic silicates and metal-silicates with a crystalline structure have now been found, which can be used for example, in the field of catalysis, of the separation of compounds in blends and nanotechnologies.

An object of the present invention therefore relates to new hybrid, organic-inorganic silicates and metal-silicates characterized by a crystalline structure, containing structural units having formula (a) wherein R is an organic group:

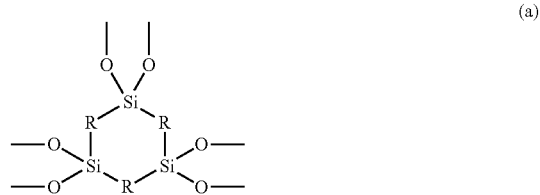

(a)

and possibly containing one or more elements T selected from elements belonging to groups IIIB, IVB and VB, and transition metals.

A preferred aspect of the present invention relates to hybrid silicates and metal-silicates having a crystalline structure, containing structural units having formula (a), wherein R is an organic group

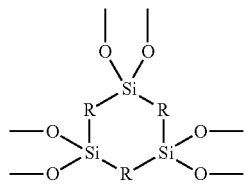
(a)

and possibly containing one or more elements T selected from elements belonging to groups IIIB, IVB and VB, and transition metals, said units (a) being connected to each other and with the element T, when present, by means of oxygen atoms.

According to a preferred aspect, in the crystalline structure of the materials of the present invention, the molar ratio Si/(Si+T) is higher than 0.3 and lower than or equal to 1, wherein Si is the silicon contained in the structural unit having formula (a).

Hybrid silicates and metal-silicates wherein said Si/(Si+T) ratio is higher than or equal to 0.5 and lower or equal to 1, are particularly preferred.

When the Si/(Si+T) ratio is equal to 1, the structure will not contain elements belonging to groups IIIB, IVB and VB, and to transition metals.

The elements T are trivalent, tetravalent or pentavalent, are in tetrahedral coordination and are inserted in the structure by means of four oxygen bridges, forming $TO_4$ units. In particular, in the structure, said $TO_4$ units can be bound, by means of these oxygen bridges, not only with the structural units of type (a), but also to each other.

T is preferably an element selected from Si, Al, Fe, Ti, B, P, Ge, Ga or is a mixture of these. More preferably, T is silicon, aluminium, iron or mixtures thereof, even more preferably, T is aluminium, or a mixture of silicon with aluminium.

When T is a trivalent element in tetrahedral coordination, the structure of the hybrid metal-silicates of the present invention will also contain Me cations which neutralize their corresponding negative charge. The cations can be, for example, cations of alkaline, earth alkaline metals, cations of lanthanides or mixtures thereof. Me cations deriving from the reagents used in the synthesis can also be contained in the silicates and in the metal-silicates wherein T is not present or T is a tetravalent element.

A preferred aspect of the present invention is therefore hybrid silicates and metal-silicates characterized by the following formula (b).

$$SiO.xTO_2.y/nMe.zC \quad (b)$$

wherein Si is silicon contained in the structural unit (a)
T is at least one element chosen from the elements belonging to the groups III B, IV B, V B, and transition metals,
Me is at least one n valence cation
C is carbon
x ranges from 0 to 2.3, and preferably from 0 to 1
y ranges from 0 to 2.3, and preferably from 0 to 1
n is the valence of the Me cation
z ranges from 0.5 to 10.

The organic group R contained in the structural unit (a) can be an aliphatic, aryl or mixed aliphatic-aryl group. The aliphatic groups can be linear or branched, and can be either saturated or unsaturated. R is preferably an alkyl group containing from 1 to 3 carbon atoms selected from —$CH_2$—, —$CH_2CH_2$—, —$C_3H_6$—, linear or branched. According to a preferred aspect, the organic group R contained in the structural unit (a) is —$CH_2$—: a particularly preferred aspect of the present invention is therefore hybrid organic-inorganic silicates and metal-silicates, called ECS-10 (ENI Carbon Silicate), characterized by:
a crystalline structure containing, as structural units (a), units having the following formula:

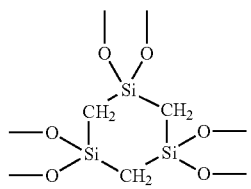

and optionally containing one or more elements T selected from elements belonging to groups III B, IV B, V B, and transition metals,
an X-ray powder diffraction pattern, using CuKα radiation (λ=1,54178 Å), showing the intensities and positions of the reflections reported in the following table 1:

TABLE 1

| d (Å) | Intensity | d (Å) | Intensity |
|---|---|---|---|
| 13.0 +/− 0.1 | vs | 3.12 +/− 0.02 | w |
| 9.39 +/− 0.08 | vw | 3.07 +/− 0.02 | w |
| 7.62 +/− 0.06 | vw | 2.82 +/− 0.01 | vw |
| 6.49 +/− 0.05 | vw | 2.78 +/− 0.01 | vw |
| 5.43 +/− 0.05 | w | 2.75 +/− 0.01 | vw |
| 5.33 +/− 0.05 | w | 2.67 +/− 0.01 | w |
| 5.02 +/− 0.05 | w | 2.61 +/− 0.01 | w |
| 4.71 +/− 0.04 | w | | |
| 4.43 +/− 0.04 | vw | | |
| 4.33 +/− 0.04 | w | | |
| 3.93 +/− 0.03 | vw | | |
| 3.81 +/− 0.03 | vw | | |
| 3.56 +/− 0.03 | w | | |
| 3.43 +/− 0.03 | w | | |
| 3.38 +/− 0.03 | w | | |
| 3.24 +/− 0.03 | s | | | wherein d indicates the interplanar distance and the intensity of the reflections is expressed as:
vs = I/Io · 100 is in the range 100-80
s = I/Io · 100 is in the range 80-50
m = I/Io · 100 is in the range 50-30
w = I/Io · 100 is in the range 30-10
vw = I/Io · 100 is in the range < 10
wherein I/Io · 100 represents the relative intensity calculated by measuring the peak height and with a percentage comparison with the height of the most intense peak.

For the particular materials ECS-10, all that is described above relating to the general group of hybrid silicates and metal-silicates of the present invention is obviously valid. In particular therefore, the silicates and metal-silicates of the ECS-10 type will have the characteristics described above relating to the general group of hybrid silicates and metal-silicates of the present invention with respect to the element T, its connection with other $TO_4$ units and with the unit (a), and with respect to the molar composition, formula (b) and content of metallic cations.

In general, in the present invention, the term silicates refers to materials according to the present invention containing silicon and possibly one or more non-metallic elements T, whereas metal-silicates refer to silicates according to the present invention containing at least one metallic element T.

$^{29}$Si-MAS—NMR analysis of the hybrid silicates and metal-silicates of the present invention reveals the presence of Si—C bonds. It is known that with $^{29}$Si NMR analysis, the silicon atoms in aluminosilicates and in their organo-silica derivatives have different chemical shifts in relation to the type of atoms directly bound and are designated as follows:

Q (SiO4) sites with a chemical shift from −90 to −120 ppm [G. Engelhardt, D. Michel in "High resolution Solid-State NMR of Silicates and Zeolites", 1987 Wiley & Sons, page 148-149], T (SiCO3) sites with a chemical shift from −40 to −85 ppm [a) I. G. Shenderovich, et al., J. Phys. Chem. B., 111, 12088-12096 (2007); b) D. Mochizuki, S. Kowata, K. Kuroda, Chem. Mater., 18, 5223-5229 (2006); c) J. T. A. Jones et al., Chem. Mater., 20, 3385-3397 (2008)], D (SiC2O2) sites with a chemical shift from −5 to −40 ppm [a) I. G. Shenderovich, et al., J. Phys. Chem. B., 111, 12088-12096 (2007); b) D. Mochizuki, S. Kowata, K. Kuroda, Chem. Mater., 18, 5223-5229 (2006); c) J. T. A. Jones et al., Chem. Mater., 20, 3385-3397 (2008)].

In accordance with this, the hybrid, crystalline organic-inorganic silicates and metal-silicates of the present invention prepared using trisilanes as silicon source, upon $^{29}$Si-MAS—NMR analysis, show signals whose chemical shift essentially falls within −5 and −90 ppm: there are few silicon atoms involved four Si—O bonds, and almost all the silicon is involved in Si—C bonds.

The trisilanes used in the preparation of the hybrid silicates and metal-silicates of the present invention have the following formula (c):

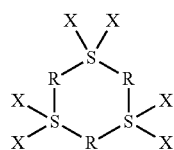

(c)

wherein R is an organic group and X is a substituent which can be hydrolyzed.

According to what is described above, in formula (c), R can be an aliphatic, aryl or mixed aliphatic-aryl group. The aliphatic groups can be linear or branched, and can be either saturated or unsaturated. In formula (c), R is preferably an alkyl group containing from 1 to 3 carbon atoms selected from —CH$_2$—, —CH$_2$CH$_2$—, —C$_3$H$_6$—, linear or branched.

A particularly preferred aspect is to use trisilanes having formula (c) wherein R is —CH$_2$—: the silicates and metal-silicates obtained using these particular trisilanes are of the ECS-10 type.

X can be an alkoxyl group having the formula OC$_m$H$_{2m+1}$ wherein m is an integer selected from 1, 2 or 3, or it can be a halogen selected from chlorine, bromine, fluorine and iodine. X is preferably an alkoxyl group. A particularly preferred aspect of the present invention is to use 1,1,3,3,5,5 hexaethoxy-1,3,5trisilylcyclohexane as cyclic trisilanes having formula (c), for the preparation of silicates and metal-silicates of the ECS-10 type.

In the case of hybrid metal-silicates containing one or more elements of type T, the reaction mixture will contain a source of each of these elements.

The process for preparing the hybrid silicates and metal-silicates of the present invention comprises:

1) adding a trisilane having formula (c) to an aqueous mixture containing at least one hydroxide of at least one metal Me selected from alkaline and/or alkaline earth metals, and possibly one or more sources of one or more elements T selected from elements belonging to groups III B, IV B, V B, and transition metals,
2) maintaining the mixture under hydrothermal conditions, at autogenous pressure, for a time sufficient for forming a solid material,
3) recovering the solid and drying it.

In step (1), in addition to the hydroxide of the metal Me, one or more salts of metal Me can possibly be additionally present.

The sources of the element T, wherein T has the meanings previously described and preferably can be Si, Al, Fe, Ti, B, P, Ge, Ga or a mixture thereof, can be the corresponding soluble salts or alkoxides. In particular, when T is silicon, well-usable sources are tetra-alkylorthosilicate, sodium silicate, colloidal silica; when T is aluminium, sources which can be well used are: aluminium isopropylate, aluminium butoxide, aluminium sulphate, aluminium nitrate or NaAlO$_2$; when T is iron, well-usable sources are iron ethoxide, iron nitrate, iron sulphate.

The hydroxide of alkaline metal is preferably sodium hydroxide and/or potassium hydroxide.

The mixture of step (1) is preferably prepared by mixing the reagents in the following molar ratios: Si/(Si+T) is greater than 0.3 and less than or equal to 1, Me$^+$/Si=0.05-5
OH$^-$/Si=0.05-2
H$_2$O/Si<100 wherein Si is the silicon contained in the trisilane having formula (c), and T and Me have the meanings described above.

Even more preferably, the mixture of step (1) is prepared by mixing the reagents in the following molar ratios:

Si/(Si+T)=0.3-0.9
Me$^+$/Si=0.1-2
OH$^-$/Si=0.1-1
H$_2$O/Si=3-50 wherein Si is the silicon contained in the trisilane having formula (c), and T and Me have the meanings described above.

A characterizing aspect of the process for the preparation of the materials of the present invention is the fact of operating in the absence of templating agents or surfactants.

In step (2) of the process of the present invention, the mixture is maintained in an autoclave, under hydrothermal conditions, at autogenous pressure, and possibly under stirring, preferably at a temperature ranging from 70 to 180° C., even more preferably from 80 to 150° C., for a time ranging from 1 hour to 50 days.

At the end of the reaction, the solid phase is separated from the mother mixture using conventional techniques, for example filtration, washed with demineralized water and subjected to drying, preferably effected at a temperature ranging from 50 to 80° C., for a time sufficient for eliminating the water completely or substantially completely, preferably from 2 to 24 hours.

The materials thus obtained can be subjected to ion exchange treatment according to the conventional methods, to obtain, for example, the corresponding acid form or exchanged with other metals Me, for example alkaline, alkaline-earth metals or lanthanides. After the ion exchange, the material is dried under the conditions described above.

The materials of the present invention can be subjected to a shaping, binding or thin layer deposition treatment according to the techniques described in literature.

The materials of the present invention can be applied as molecular sieves, adsorbents, in the field of catalysis, in the field of electronics, in the field of sensors, in the area of nanotechnology.

The following examples are provided for a better illustration of the invention without limiting it.

EXAMPLE 1

Synthesis of an Aluminium Silicate of the ECS-10 Type

An aqueous solution is prepared by dissolving 0.21 g of NaOH in 6.86 g of demineralized water. 4.36 g of NaAlO$_2$ (54% weight of Al$_2$O$_3$) are added to the limpid solution thus obtained, under constant stirring, until a slightly opalescent solution is obtained. 4.58 g of 1,1,3,3,5,5 hexaethoxy—1,3,5 trisilyl cyclohexane are then added.

The mixture thus obtained has the following composition, expressed in terms of molar ratios:

SiO$_2$/Al$_2$O$_3$=1.5
Na$^+$/Si=1.69
OH$^-$/Si=0.15
H$_2$O/Si=11

The autoclave is charged into an oven heated to 100° C. for 14 days, under autogenous pressure and subjected to an oscillating movement. At the end of the hydrothermal crystallization, the autoclave is cooled to room temperature and the solid obtained is separated from the mother liquor by filtration, washed with demineralized water and dried in an oven at 120° C. for hours. The sample obtained shows a powder X-ray diffraction pattern, registered by means of a vertical goniometer equipped with an electronic impulse count system and using a CuKα radiation (λ=1.54178 Å) indicated in FIG. 1, whose intensity and reflection positions are indicated in Table 2.

TABLE 2

| d (Å) | I/I$_0$ · 100 | d (Å) | I/I$_0$ · 100 |
|---|---|---|---|
| 13.0 | 100 | 3.12 | 21 |
| 9.39 | 1 | 3.07 | 11 |
| 7.62 | 10 | 2.82 | 6 |
| 6.49 | 9 | 2.78 | 9 |
| 5.43 | 29 | 2.75 | 9 |
| 5.33 | 24 | 2.67 | 10 |
| 5.02 | 10 | 2.61 | 14 |
| 4.71 | 16 | | |
| 4.43 | 6 | | |
| 4.33 | 12 | | |
| 3.93 | 10 | | |
| 3.82 | 6 | | |
| 3.56 | 18 | | |
| 3.44 | 11 | | |
| 3.38 | 11 | | |
| 3.24 | 70 | | |

The invention claimed is:

1. A hybrid organic-inorganic silicate or metal silicate, having a crystalline structure comprising at least one structural unit of formula (a), wherein R is an organic group:

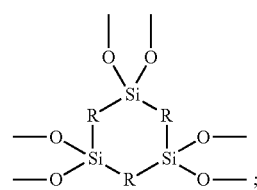

and optionally comprising at least one T element selected from the group consisting of an element of group III B, an element of group IV B, an element of group V B, and a transition metal.

2. The silicate of claim 1, having a crystalline structure which comprises at least one structural unit of formula (a), wherein R is an organic group:

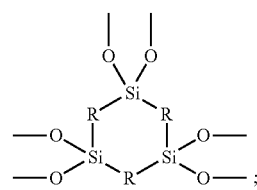

and optionally comprising at least one T element selected from the group consisting of an element of group III B, an element of group IV B, an element group of V B, and a transition metal, wherein the units (a) are linked to each other and to the T element, when present, with at least one oxygen atom.

3. The silicate of claim 1, wherein the organic group R comprised in the structural unit (a) is an aliphatic, arylic, or mixed aliphatic-arylic group.

4. The silicate of claim 3, wherein the aliphatic group is present and is saturated or unsaturated, linear, or branched.

5. The silicate of claim 4, wherein R is an alkyl group comprising from 1 to 3 carbon atoms selected from the group consisting of —CH$_2$—, —CH$_2$CH$_2$—, linear —C$_3$H$_6$—, and branched —C$_3$H$_6$—.

6. A hybrid organic-inorganic silicate or metal silicate, which is called ECS-10, having a crystalline structure comprising at least one structural unit of formula (a), wherein R is an organic group:

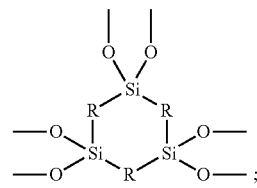

wherein the crystalline structure comprises as the structural units (a), at least one unit of formula (II):

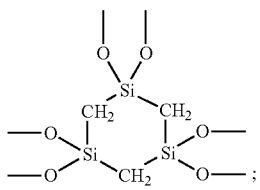

and optionally comprising at least one T element selected from the group consisting of an element group III B, an element of group IV B, an element of group V B, and a transition metal, wherein an X-ray powder diffraction pattern, with CuKα radiation at λ=1,54178 Å, showing intensities and positions of reflections is:

| d (Å) | Intensity | d (Å) | Intensity |
|---|---|---|---|
| 13.0 +/− 0.1 | Vs | 3.56 +/− 0.03 | w |
| 9.39 +/− 0.08 | Vw | 3.43 +/− 0.03 | w |
| 7.62 +/− 0.06 | Vw | 3.38 +/− 0.03 | w |
| 6.49 +/− 0.05 | Vw | 3.24 +/− 0.03 | S |
| 5.43 +/− 0.05 | W | 3.12 +/− 0.02 | w |
| 5.33 +/− 0.05 | W | 3.07 +/− 0.02 | w |
| 5.02 +/− 0.05 | W | 2.82 +/− 0.01 | vw |
| 4.71 +/− 0.04 | W | 2.78 +/− 0.01 | vw |
| 4.43 +/− 0.04 | Vw | 2.75 +/− 0.01 | vw |
| 4.33 +/− 0.04 | W | 2.67 +/− 0.01 | w |
| 3.93 +/− 0.03 | Vw | 2.61 +/− 0.01 | w |
| 3.81 +/− 0.03 | Vw | | | wherein d indicates an interplanar distance and the intensity of the reflections is expressed as
vs = I/Io · 100 is in a range 100-80,
s = I/Io · 100 is in a range 80-50,
m = I/Io · 100 is in a range 50-30,
w = I/Io · 100 is in a range 30-10, and
vw = I/Io · 100 is in a range <10, and
I/I$_o$ · 100 represents a relative intensity calculated by measuring a peak height and deriving a percentage with respect to a height of the most intense peak.

7. The silicate of claim 1, wherein the at least one T element is trivalent or tetravalent, in tetrahedral coordination, and forms TO$_4$ units linked with at least one oxygen bridge to the structural unit (a).

8. The silicate of claim 7, wherein the TO$_4$ units, besides being linked to the structural units (a), are also linked to each other.

9. The silicate of claim 1, wherein an Si/(Si+T) molar ratio is higher than 0.3 and lower than or equal to 1,
wherein Si is the silicon comprised in the structural unit of formula (a).

10. The silicate of claim 1, wherein T is at least one element selected from the group consisting of Si, Al, Fe, Ti, B, P, Ge, and Ga.

11. A silicate of claim 10, wherein T is silicon, aluminum, iron, or mixture of silicon and aluminum.

12. The silicate of claim 1, further comprising:
at least one Me cation.

13. The silicate of claim 1, conforming to formula (b)

SiO.xTO$_2$.y/nMe.zC    (b), wherein Si is silicon comprised in the structural unit (a),
T is at least one element selected from the group consisting of an element of group III B, an element of group IV B, an element of group V B, and a transition metal,
Me is at least one n valence cation,
C is carbon,
x ranges from 0 to 2.3,
y ranges from 0 to 2.3,
n is the valence of the at least one Me cation, and
z ranges from 0.5 to 10.

14. The silicate of claim 1, having $^{29}$Si-MAS-NMR signals whose chemical shift essentially falls in a range between −5 and −90 ppm.

15. A process for preparing the silicate of claim 1, comprising:
(1) adding a trisilane of formula (c)

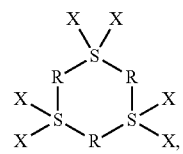

wherein
R is an organic group, and
X is a substituent which can be hydrolyzed,
into an aqueous mixture comprising at least one hydroxide of at least one Me metal selected from the group consisting of an alkali metal and an alkaline-earth metal, and optionally at least one source of at least one T element selected from the group consisting of an element of groups III B, an element of group IV B, an element of group V B, and a transition metals, to obtain a mixture;
(2) keeping the mixture under hydrothermal conditions and autogenous pressure, for a time sufficient to form a solid material; and
(3) recovering the solid material and drying the solid material.

16. The process of claim 15, wherein in the adding (1), in addition to Me metal hydroxide, at least one Me metal salt is present.

17. The process of claim 15, wherein the R group of the trisilane of formula (c) is an aliphatic, arylic, or mixed aliphatic-arylic group.

18. The process of claim 15, wherein at least one ECS-10 silicate or metal silicate is prepared, and
wherein, in the trisilane of formula (c), the R group is —CH$_2$—.

19. The process of claim 15, wherein at least one ECS-10 for silicate and metal silicate is prepared, and
wherein the trisilane of formula (c) comprises 1,1,3,3,5,5 exaethoxy-1,3,5trisilylcyclohexane.

20. The process of claim 15, wherein the mixture of the adding (1) is prepared by mixing reagents in the following molar ratios:
Si/(Si+T) is higher than 0.3 and lower than or equal to 1;
Me$^+$/Si=0.05-5;
OH$^-$/Si=0.05-2;
H$_2$O/Si<100,
where Si is silicon comprised in the trisilane of formula (c).

21. The process according to claim 15, wherein, in the keeping (2), the mixture is kept in an autoclave, under hydrothermal conditions and autogenous pressure, and optionally under stirring.

22. The process of claim 21, wherein the temperature is between 70 and 180° C.

23. A molecular sieve, an adsorbent, or a catalyst component, comprising the silicate of claim 1.

* * * * *